3,404,948
PROCESS FOR MAKING SODIUM ARSENATE
Lewis P. Harris, Fanwood, and Earl F. Rothemich, Califon, N.J., assignors to The Sherwin-Williams Company, a corporation of Ohio
No Drawing. Filed Apr. 27, 1965, Ser. No. 451,341
2 Claims. (Cl. 23—53)

This invention relates to a process for producing dry granular porous sodium arsenate. Sodium arsenate is an industrially useful material particularly in respect of its use as an intermediate in producing wood preservative compositions. These comprise a group of selected chemicals used to protect wood from decay, insects, or marine borers. These materials can be classified into two main classes, the oils, for example, copper naphthenate, creosote and petroleum solutions of pentachlorophenol; and water borne salts that are administered with or without the application of pressure as water solutions. The arsenic type wood preservatives belong to the water borne classification. A particularly useful wood preservative composition is chromated copper or zinc arsenates formed in situ in the wood body. The reactants are introduced into wood as water solutions and they form the insoluble but active compounds. The impregnating solution is formed from arsenic acid, sodium arsenate, sodium dichromate, chromic acid, copper salts or zinc sulfate or oxide dissolved in water or dilute arsenic acid.

The arsenic acid, as such, and the sodium arsenate are the main active ingredients against wood destroying fungi and insects. The other components in the solution transfer by their reactions with wood the active chemicals into insoluble compounds thus fixing them and controlling subsequent leaching.

Dry sodium arsenate can be crystallized from a water solution as the dodecahydrate. This material contains only 28% of $As_2O_5$ by weight in the hydrate. Conversion to the anhydrous salt is difficult and expensive. Theoretically the anhydrous disodium arsenate material contains 61.8% $As_2O_5$. It has now been found that dry sodium arsenate can be prepared by adding concentrated aqueous arsenic acid to dry sodium carbonate in a heavy duty mixer at a temperature above the boiling point of water but below the dehydration temperature for arsenic acid. In this way, an extended drying step can be avoided because most of the water originally present in the concentrated acid, and that formed during the reaction, are driven off along with the carbon dioxide formed during the reaction because of operating above the critical temperature for the hydrates, where they do not form. The reaction is quite rapid so that a relatively small continuous mixer is desired, followed by curing belt and final dryer. The balance of the apparatus desirably includes a crusher and screens. If need be, fines can be recycled to the basic mixer.

Briefly stated, the present invention then is in the method of making a porous, granular essentially dry sodium arsenate containing from 60% to 70% by weight of $As_2O_5$ which comprises the steps of reacting with mixing or agitation dry sodium carbonate with hot aqueous arsenic acid containing from 82% to 90% $H_3AsO_4$ and the balance water, at a temperature of from 100° C. to 195° C. until the reaction is complete, removing bulk of water formed and water added with the acid during the reaction, and crushing the resultant porous mass of sodium arsenate.

As indicated above, the reactant materials are dry sodium carbonate or bicarbonate and concentrated arsenic acid. The sodium carbonate or, soda ash, is preferably in powdered form and capable of passing through a 20 mesh screen. It is desirably free of any lumps. The arsenic acid solution is stronger than the commercial 75% solution and contains from 82% to 90% $H_3AsO_4$, the balance of the solution being water. If the acid concentration is less than about 82% the cake reaction product which is formed is mushy and damp, and at 60° C. without proper aging melts to a syrup in an oven. Best results are obtained at concentrations between 85% and 88% arsenic acid. If arsenic acid is held at an elevated temperature for a prolonged period of time it gradually loses water, assuming the ambient atmosphere will accept it, until a solid hydrated arsenic pentoxide is obtained which cannot be used in the process. Because the reaction in the process is so rapid, dehydration of the acid in this manner does not have an opportunity to occur to an appreciable extent. If the reaction is carried out at ambient temperatures with these concentrations of acid, then a drying stage is required to obtain the dry sodium arsenate product. This allows for removal of water of reaction.

The reaction is carried out with stirring or mixing within the broad temperature range above indicated, but preferably from 100° C. to 145° C., without conditions other than ambient being imposed. However, water removal is improved by carrying out the reaction in a system which is conducive to rapid water removal as it is produced in the reaction mass. For example, the reaction can be carried out under reduced pressure conditions also to aid in water removal. It becomes convenient at this point to illustrate this invention by several examples.

Example 1

One hundred and six parts of soda ash by weight are mixed with 167 parts of 85% arsenic acid solution with the rate of addition limited by the evolution of gases or foaming. It is as rapid as permitted by the equipment. The theoretical dry yield is 187 parts disodium arsenate but 196 parts were obtained dried at 120° C. overnight and analyzed 64.8% $As_2O_5$. To obtain the desired porous structure of the resulting product it is essential that mixing be stopped while the carbonate is not yet completely reacted with the acid. Otherwise the glassy material which would result would be too difficult to crush, and water cannot penetrate to give rapid dissolving. The determination of the point when mixing is to be terminated is by visual means and it occurs shortly after the last of the reagents has been added, i.e. the acid added to the dry powdered sodium carbonate or the dry sodium carbonate added to the hot acid solution. The reaction is vigorous and results in the reaction mass foaming up. As the reaction begins to subside, the level of the foam begins to fall. This is a visible indication of the terminal portion of the reaction where mixing is stopped. On the cessation of stirring the product foam rises again and then sets and hardens. The resulting product is, upon cooling, a rigid porous mass which is easily crumbled, dissolves readily and being hygroscopic does not tend to block as does pulverized powdered sodium arsenate.

Stoichiometric quantities of the materials are preferably used although if one is to be in excess of the other it is preferably the arsenic acid component. After one exceeds the theoretical stoichiometric value of arsenic acid equivalent to 100% $H_3AsO_4$ some portion of mono sodium salt is formed. This may account for the sodium arsenate analyzing in excess of the theoretical 61.8% $As_2O_5$.

Example 2

One hundred and six parts of sodium carbonate, through 20 mesh, were placed in a mixing apparatus and 175 parts of 82% $H_3AsO_4$ at 120° C. aqueous solution were added and the reaction carried out until evolution of carbon dioxide and water had ceased, following the procedure of Example 1. There was obtained very quickly a rigid porous cake of product which was then crushed and dried. This material analyzed 60.4% $As_2O_5$.

Example 3

Following the same procedure as set forth in Example 2 above, 106 parts soda ash, and 200 parts of 86% solution were reacted at a temperature of 110° C. There were obtained 212 parts of product analyzing 65% $As_2O_5$.

Example 4

Following the same procedure of Example 1 above, 106 parts of soda ash, through 20 mesh, were mixed with 210 parts of 89% arsenic acid and the reaction carried out at 120° C. This product was allowed to cure over a period of two hours at about 45° C. to allow completion of reaction and then dried at 120° C. The resultant product analyzed 66.7% $As_2O_5$.

Example 5

This example illustrates a variation wherein a substantial part but not all of the sodium carbonate or bicarbonate is replaced with sodium hydroxide. One hundred and eighty grams 86% arsenic acid was mixed with 1.5 moles NaOH and 0.5 mole of $NaHCO_3$. When the acid is cold, the product analyzed 55.3% $As_2O_3$ without drying and had a spongy structure.

When repeated using 200 grams of hot acid at 140° C., the product analyzed 54.3% $As_2O_3$ as soon as mixed; after one hour at room temperature, 61.0% $As_2O_5$; and after two hours at 120° C. in an oven 67.0% $As_2O_5$.

The reaction at lower concentrations of $NaHCO_3$ is very violent.

When the dry salts formed according to Examples 1 to 5 are redissolved in arsenic acid, and crystallized from the solution, drained, washed with alcohol and dried, well defined colorless crystals are obtained analyzing from 60% to 70.5% $As_2O_5$.

At 82% concentration, if the acid is mixed cold with the sodium carbonate, a product is obtained which melts in the drying oven. However, when the acid at 82% concentration is admixed with the sodium carbonate hot i.e. at a temperature of from 100° C. to 145° C. a granular product is formed analyzing from 60.8% to 61.9% $As_2O_5$. Repeated attempts with hot 75% acid yielded a product which melted as soon as any effort to dry it was made. Sixty-five percent arsenic acid when used hot with powdered sodium carbonate yielded only a syrup. On standing overnight this composition developed a slush of crystals which may have been the hepta-hydrate.

If more highly concentrated acid is used hot, no drying is necessary after the mixing step. There is, however, a tendency for the reaction not to be complete as evidenced by some effervescence on dissolving the salt in water. This should not interfere in any way with the final use of the product, particularly in wood preservative compositions.

As indicated above, the product produced by this process forms quite quickly and as a solid cake which may then be crushed. To improve the degree of reaction, the product may be allowed to stand in an enclosed container or room at a temperature below 100° C., e.g. from room temperature to 100° C. for a period of time. This period may vary from 15 minutes to 24 hours. By controlling the atmosphere in the chamber, the extent of water removal may be greatly enhanced. Thus, a dry atmosphere may be circulated through the room or chamber or the chamber may be submitted to sub-atmospheric pressures.

After the product has been formed to a desired degree of completion of the reaction, it is crushed by any suitable crushing means, screened, and packaged in air tight containers. The product is extremely hygroscopic and will in time pick up as much as one half of its weight in water when exposed to moisture-containing atmosphere. The resulting product is a dry sodium arsenate useful in forming water soluble wood preservative compositions in the manner indicated above.

The end product is a dry porous granular material which does not "block" even if allowed to absorb water as does powdered material made by melting and drying the hydrates formed in water solutions which give a glassy final cake. The granular porous product when added to water does not form a stuck together mass and being porous dissolves more rapidly than "glassy" material. Also being granular rather than powder there is less hazard from toxic dust.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. The method of making porous granular dry sodium arsenate containing from 60% to 70% $As_2O_5$ by weight which comprises reacting dry sodium carbonate with hot aqueous arsenic acid containing from 82% to 90% $H_3AsO_4$ and the balance water at a temperature of from 100° C. to 195° C. until the reaction is complete with stirring during the reaction, said stirring being terminated prior to completion of the reaction of all the carbonate, removing water formed during the reaction and water added with the acid, and crushing the resultant solid sodium arsenate mass.

2. The method of making porous granular dry sodium arsenate containing from 60% to 70% $As_2O_5$ by weight which comprises reacting dry sodium bicarbonate with hot aqueous arsenic acid containing from 82% to 90% $H_3AsO_4$ and the balance water at a temperature of from 100° C. to 195° C. until the reaction is complete with stirring during the reaction, said stirring being terminated prior to completion of the reaction of all the bicarbonate, removing water formed during the reaction and water added with the acid, and crushing the resultant solid sodium arsenate mass.

References Cited

UNITED STATES PATENTS

| 1,690,628 | 11/1928 | Ellis et al. | 23—53 |
| 3,090,668 | 5/1963 | Harris | 23—53 |

FOREIGN PATENTS

| 544,195 | 2/1932 | Germany. |

OTHER REFERENCES

Mellor: A Comprehensive Treatise On Inorganic and Theoretical Chemistry, vol. 9, 1929, pp. 150 and 151. Copy in Patent Office Chemical Library, published by Longmans, Green & Co., N.Y.

OSCAR R. VERTIZ, *Primary Examiner.*

B. H. LEVENSON, *Assistant Examiner.*